UNITED STATES PATENT OFFICE.

HAROLD HIBBERT, OF PITTSBURGH, PENNSYLVANIA.

LIQUID COMPOSITION.

1,213,368.  Specification of Letters Patent.  Patented Jan. 23, 1917.

No Drawing.   Application filed January 10, 1916. Serial No. 71,215.

*To all whom it may concern:*

Be it known that I, HAROLD HIBBERT, a subject of the King of Great Britain, residing in Pittsburgh, Allegheny county, State of Pennsylvania, have invented certain new and useful Improvements in Liquid Compositions; and I do hereby declare the following to be a full, clear, and exact description of the invention, such as will enable others skilled in the art to which it appertains to make and use the same.

The present invention is based upon the discovery that by mixing glycols of the 1.2-glycol type with water, the resulting liquid composition has valuable and important properties as a heating and refrigerating liquid, being relatively non-volatile, and remaining liquid at temperatures far below the freezing point of the water itself. While these particular glycols and water are capable of intermingling in widely differing proportions, I have found that the optimum results with respect to the absorption and retention of water are usually obtained when the water and the glycol or glycols are used in about equal proportions, and particularly in the proportions of 60 to 65 parts water and 35 to 40 parts glycols. I have further found that the mixture of ethylene, propylene and butylene glycols obtainable from oil gas, is a particularly valuable mixture for mixing with water to produce the water-glycol composition. The production of such a mixture is described more in detail in my prior application Serial No. 9774, filed February 23, 1915. Thus, such mixtures of glycols can be produced from oil gas, obtained from the vaporization and gasification of a hydrocarbon oil such as naphtha, solar oil, or the like. This oil gas is cracked at temperatures of about 600 to 900° C., and thereby converted into a mixture consisting of about 50 to 60% of unsaturated ethylene derivatives, the remainder being largely hydrogen and saturated hydro-carbons of the methane series. The unsaturated derivatives of the ethylene series consist essentially of a mixture of ethylene, propylene and butylene, the proportions of these several constituents varying to some extent, according to the apparatus employed, the temperature of the cracking, etc.

The mixture of unsaturated derivatives can be converted into the gylcols by first treating with chlorin and thereby forming the corresponding dichlor derivatives, and then saponifying these chlorin compounds by heating in the presence of a suitable saponifying agent such as an aqueous carbonate solution, *e. g.*, at a temperature between 150 and 200° C. I find that under these conditions an excellent yield of the corresponding glycols can be readily obtained. I do not, however, desire to limit myself to this particular method of producing the glycol mixture, since I believe the novel heating and refrigerating composition of the present invention to be broadly new in the art, irrespective of the method of producing the glycol or glycols utilized therein. I consider, however, the particular mixture of ethylene, propylene and butylene glycols with water as a particularly valuable embodiment of the invention. The proportions of the mixture of glycols and of water can be varied, as above stated, but the proportions of about 60 to 65 parts of water and 35 to 40 parts of the glycol mixture have been found of particular value for purposes of the present invention.

Instead of using a mixture of glycols, the individual glycols can be used in a similar manner and with corresponding advantages. Thus the composition may be made of ethylene glycol and water, in suitable proportions. Ethylene glycol is readily obtainable from ethyl or grain alcohol, in the following manner. When the alcohol is passed over a heated contact mass, such as aluminum oxid, it is converted into ethylene and water, with practically theoretical yield. By causing the ethylene to react with chlorin it is readily converted into ethylene dichlorid, and the latter, on heating with an aqueous solution of sodium carbonate under pressure, as briefly outlined above and in my prior application Serial No. 9774, is converted into ethylene glycol, in excellent yield.

The novel composition of the present invention is characterized by the property of remaining liquid at very low temperatures, and of being relatively non-volatile at ordinary temperatures, and at temperatures much higher than the ordinary. It can be used in circulatory cooling and refrigerating systems wherever a liquid composition is desired of a low freezing point. It is thus of particular value in automobile, aeroplane, and motor boat, cooling systems where the cooling agent is circulated from the radiator to the jackets of the engines, and where the cooling agent is required to withstand temperatures much above the ordinary, as well as temperatures below the freezing point of water. It is also of particular value for use in heating systems because of its relatively non-volatile character, and the fact that danger of accidental freezing up of the system is thereby prevented at low temperatures.

Instead of using the individual glycols with water or a mixture of two or more glycols with water, in producing the composition of the present invention, polyglycols can be used, or mixtures of polyglycols, particularly mixtures of polyglycols with the glycols themselves. The polyglycols or mixtures of polyglycols can be produced by heating the individual glycols or their mixtures, for varying periods of time. They are usually produced in small amount, and accordingly are present mixed with relatively larger amounts of the uncondensed glycols. By varying the relative amounts of the polyglycols the viscosity and other properties of the composition can be correspondingly varied and regulated.

The viscosity of the glycol water composition can also be varied and regulated by the addition and admixture of glycerin or polyglycerins, either singly or together in varying proportions, as well as by the utilization of polyglycols; also, the polyglycols can be utilized together with the glycerin and polyglycerins, for incorporation with the glycol-water composition.

Accordingly, I consider the novel composition of the present invention, in its broader aspect, to include compositions of water and glycols of the 1.2-glycol type whether a single glycol be used, or a mixture of two or more glycols, or a mixture of one or more glycols with polyglycols, glycerin or polyglycerins, or mixtures thereof, in varying proportions, and I use the term glycol or glycols with a correspondingly broad signification to include, in the glycol-water composition, the individual glycols or polyglycols or mixtures thereof, either alone or with glycerin, polyglycerin, etc.

The glycols of the novel composition of the present invention are 1.2-glycols or glycols of the 1.2-glycol type, that is to say, containing their hydroxyl groups on adjacent carbon atoms, and obtainable, as described, from unsaturated ethylene hydrocarbons. These 1.2-glycols correspond to the unsaturated hydrocarbons from which they are obtainable.

Various liquids have heretofore been proposed for use in the cooling systems of automobiles, aeroplanes, etc., in order to prevent freezing at low temperatures. Alcohol is sometimes used in place of water, but it is volatile at relatively low temperatures. Glycerin mixtures have also been proposed, but they are of a more viscous nature, particularly where large amounts of glycerin are used, and their circulation is retarded by this fact. The novel composition of the present invention is of a thinly fluid nature such that it can readily circulate through the cooling or refrigerating system. It is also capable of withstanding both relatively high and low temperatures, as above pointed out.

I claim:

1. A heating and refrigerating liquid composition comprising water and glycols of the 1.2-glycol type miscible therewith, said composition being relatively non-volatile and remaining liquid at low temperatures; substantially as described.

2. A heating and refrigerating liquid composition comprising water and a mixture of 1.2-glycols including ethylene, butylene and propylene glycols, said composition being relatively non-volatile and remaining liquid at low temperatures; substantially as described.

3. A heating and refrigerating liquid composition comprising about 60 to 65 parts of water and 35 to 40 parts of glycols of the 1.2-glycol type miscible therewith, said composition being relatively non-volatile and remaining liquid at low temperatures; substantially as described.

4. A heating and refrigerating liquid composition comprising about 60 to 65 parts of water and 35 to 40 parts of a mixture of 1.2-glycols including ethylene, propylene and butylene glycols, said composition being relatively non-volatile and remaining liquid at low temperatures; substantially as described.

5. A heating and refrigerating liquid composition comprising water and a mixture of glycols and polyglycols, said composition being relatively non-volatile and remaining liquid at low temperatures; substantially as described.

6. A heating and refrigerating liquid composition comprising about 60 to 65 parts of water and 35 to 40 parts of a mixture of glycols of the 1.2-glycol type and polyglycols; said composition being relatively non-volatile and remaining liquid at low temperatures; substantially as described.

In testimony whereof I affix my signature.

HAROLD HIBBERT